United States Patent
Tsunoda

(10) Patent No.: US 7,248,775 B2
(45) Date of Patent: Jul. 24, 2007

(54) IMAGE RECORDING APPARATUS

(75) Inventor: Hiroshi Tsunoda, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1080 days.

(21) Appl. No.: 10/076,532

(22) Filed: Feb. 19, 2002

(65) Prior Publication Data

US 2002/0114621 A1 Aug. 22, 2002

(30) Foreign Application Priority Data

Feb. 19, 2001 (JP) .............................. 2001-042239

(51) Int. Cl.
*H04N 9/00* (2006.01)
*H04N 11/00* (2006.01)
*H04N 5/76* (2006.01)
*H04N 7/00* (2006.01)
*H04N 5/00* (2006.01)

(52) U.S. Cl. .............................. 386/46; 386/1; 386/125

(58) Field of Classification Search .................... 386/1, 386/45, 46, 125, 126
See application file for complete search history.

(56) References Cited

U.S. PATENT DOCUMENTS

| | | | |
|---|---|---|---|
| 5,572,333 A * | 11/1996 | Moriyama et al. | 386/98 |
| 6,226,447 B1 * | 5/2001 | Sasaki et al. | 386/112 |
| 6,263,148 B1 * | 7/2001 | Hori et al. | 386/46 |
| 6,424,795 B1 * | 7/2002 | Takahashi et al. | 386/120 |
| 6,928,229 B2 * | 8/2005 | Okada | 386/46 |
| 7,003,154 B1 * | 2/2006 | Peker et al. | 382/173 |

FOREIGN PATENT DOCUMENTS

| | | |
|---|---|---|
| JP | 04-137880 | 5/1992 |
| JP | 08-125960 | 5/1996 |

* cited by examiner

*Primary Examiner*—Thai Tran
*Assistant Examiner*—Nigar Chowdhury
(74) *Attorney, Agent, or Firm*—Westerman, Hattori, Daniels & Adrian, LLP.

(57) ABSTRACT

An image recording apparatus includes a CCD light-receiving element. An image signal of an object captured by the light-receiving element is stored on an image memory via a signal processing circuit, and subsequently compressed by an image compression/expansion circuit. An image file including a compressed image signal is recorded on a hard disk via a temporary storing memory. Data area of the hard disk is divided into a plurality of clusters, and the image file is recorded into each cluster. Link information indicating a link state of each cluster is recorded in a management area of the hard disk. Herein, a size of the image file is equal to or smaller than 1/N of that of the cluster.

2 Claims, 11 Drawing Sheets

FIG. 2

| SOI | START IMAGE FILE |
|---|---|
| APPn | APPLICATION MARKER SEGMENT |
| DQT | QUANTIZATION TABLE |
| DHT | HUFFMAN TABLE |
| DRI | RESTART INTERVAL |
| SOF | FRAME HEADER |
| SOS | SCAN HEADER |
| (DATA) | COMPRESSED IMAGE DATA |
| EOI | END IMAGE FILE |

| | |
|---|---|
| f0000001.jpg 01-02-28 00:00.01 | ~284 |
| f0000002.jpg 01-02-28 00:00.01 | ~284 |
| f0000003.jpg 01-02-28 00:00.01 | |
| f0000004.jpg 01-02-28 00:00.02 | |
| f0000005.jpg 01-02-28 00:00.02 | |
| ⋮ | |
| fnnnnnnn.jpg YY-MM-DD hh:mm:ss | ~284 |
| ⋮ | |

| |
|---|
| f0000001.jpg LINK INFO. |
| f0000002.jpg LINK INFO. |
| f0000003.jpg LINK INFO. |
| f0000004.jpg LINK INFO. |
| f0000005.jpg LINK INFO. |
| ⋮ |
| fnnnnnnn.jpg LINK INFO. |
| ⋮ |

IMAGE RECORDING APPARATUS

BACKGROUND OF THE INVENTION

1. Field of the invention

The present invention relates to an image recording apparatus applied to a surveillance camera apparatus, for example. More specifically, the present invention relates to an image recording apparatus which records an image signal of a photographed object onto a recording medium such as a hard disk in a compressed state.

2. Description of the prior art

With respect to a generally-used method of recording image signals into a recording medium, there is an FAT (File Allocation Table) system. In this system, a data area and a management area are formed within a recording medium, and the data area is finely divided into unit recording zones each of which is called a cluster. The image signal is recorded into the data area in clusters, and link information (management information) indicating how the clusters to which the image signal are recorded is linked is recorded into the management area. Therefore, even if the image signal is recorded into vacant clusters sporadically distributed due to a repetition of recordings and erasures, it is possible to appropriately reproduce the image signal based on the link information in the management area.

However, in a conventional FAT system, a cluster size is smaller than a frame size the image signal, and the image signal of each frame is recorded into a plurality of clusters. Therefore, if the link information of the cluster is destructed, it is not possible to reproduce the image signal.

SUMMARY OF THE INVENTION

Therefore, it is a primary object of the present invention to provide a novel image recording apparatus.

It is another object of the present invention to provide an image recording apparatus capable of easily reproducing an image signal even when management information is destructed.

According to the present invention, an image recording apparatus which records image signals in a compressed state into a recording medium on which a plurality of unit recording zones each of which has a first size are formed, comprises: an inputter for inputting image signals; a compressor for compressing each of the image signals inputted by the inputter into a second size which is equal to or smaller than 1/N (N: integer) of the first size; and a recorder for respectively recording compressed image signals generated by the compressor into the unit recording zone.

The image signals inputted by the inputter are compressed by the compressor, and the compressed image signals thereby obtained are recorded in the unit recording zones formed in the recording medium. Each unit recording medium has the first size, and the compressed image signals have a second size which is equal to or smaller than 1/N of the first size. This is the reason why N of the compressed image signals is recorded in each of the unit recording zones. Therefore, even if management information regarding the image signal is destructed, it is still possible to easily reproduce the image signals.

It is preferred that the recorder search unit recording zones each of which is in a vacant state, write the compressed image signals into the discovered unit recording zones, and create link information indicating a link state of the unit recording zones in which the compressed image signals are written.

It is further preferred that a successive identifying number be assigned to each of the compressed image signals by the assigner. A restorer restores the link information on the basis of the identifying number when accepting a restoring instruction of the link information.

When N=1 is true, the recorder may bring a forefront of each of the compressed image signals into being coincident with a forefront of each of the unit recording zones.

When N≧2 is true, it may be possible that the recorder detects a difference of each size of the compressed image signals and the second size, and an interval equivalent to the difference is formed between a compressed image signal to be recorded this time and a compressed image signal to be recorded next time in the same unit recording zone.

It is preferred that the compressor repeatedly carry out a compression process up to each size of the compressed image signals being equal to or smaller than 1/N of the first size.

It is preferred that each of the image signals be a still image signal, and the compressor perform a compression process in accordance with a JPEG format.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing one example of a format of an image file;

FIG. 4 is an illustrative view showing one example of a recording state of a data area formed on the hard disk;

FIG. 5 is an illustrative view showing one example of a recording state of a management area formed on the hard disk;

FIG. 6 (b) is an illustrative view showing another part of operation of FIG. 1 embodiment;

FIG. 6 (c) is an illustrative view showing still another part of operation of FIG. 1 embodiment;

DETAILED DESCRIPTION OF THE PREFERRED EMBODIMENTS

Figure 1:
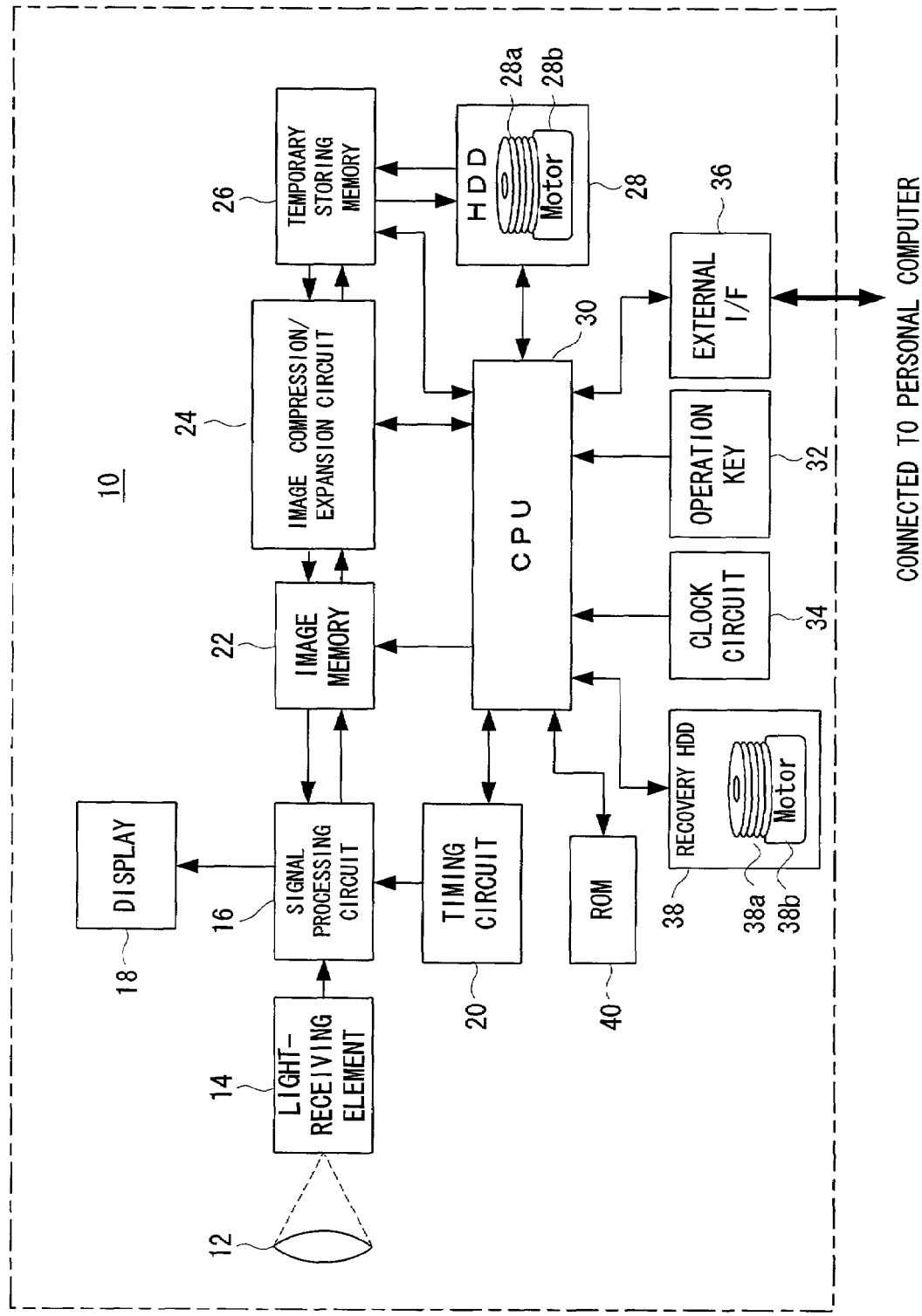
FIG. 1 is a block diagram showing a constitution of one embodiment of the present invention.

Referring to FIG. 1, a surveillance camera apparatus 10 of this embodiment photographs an object which is not shown at a ratio of once in a predetermined period, and records a still image of each object photographed. A CCD light-receiving element 14 converts an optical image of the object obtained through a lens 12 into an image signal (electric charge) by a photoelectric conversion, and inputs a converted image signal into a signal processing circuit 16. The signal processing circuit 16 subjects a signal processing such as an amplification, a filtering, etc. to the inputted image signal, and applies a processed image signal to a display 18. Thus, a real time moving image of the object is represented on the display 18.

The signal processing circuit 16 also converts the aforementioned image signal into a digital signal, that is, image data in response to a timing signal provided from a timing circuit 20. The image data is inputted into an image compression/expansion circuit 24 via an image memory 22, and subjected to an image compression in accordance with a JPEG format. Thus, an image file shown in FIG. 2 is created.

As shown in FIG. 2, the image file starts by "SOI" or a start marker. Following "SOI", "APPn" or a marker of an application marker segment, "DQT" or a marker of a quantization table, "DHT" or a marker of a Huffman encoding table, "DRI" or a marker of a restart interval, "SOF" or a marker of a frame header, and "SOS" or a marker of a scan header are added in this order. The compressed image data is present following the scan header "SOS", and "EOI" or an end marker is added to the end of the compression image data. A date on which the image file is created, that is, year-month-day information indicating a photographing date is recorded in the application marker segment.

Note that since the application marker segment is defined by an Exif (Exchange Image File format) system or a DCF (Design rule for Camera File System) system, and a table and a header other than the application marker segment are defined by a JPEG system, a detailed description is herein omitted.

The image file created by the image compression/expansion circuit 24 is accumulated on a temporary storing memory 26, and thereafter recorded in a hard disk 28a by a hard disk drive 28. Note that the hard disk 28a is held by a spindle motor 28b.

A series of such the operations from the photographing of the object to the recording of the image file is started by an operation of an operation key 32 connected to a CPU 30. More specifically, if a recording starting key (not shown) constituting the operation key 32 is depressed, the CPU 30 writes the image data generated by the signal processing circuit 16 onto the image memory 22 in response to the timing signal produced by the timing circuit 20, and compresses the image data stored in the image memory 22 by controlling the image compression/expansion circuit 24. Then, the image file accumulated in the temporary storing memory 26 is transferred to the hard disk drive 28. The image file is recorded in the hard disk 28a by the hard disk drive 28.

Note that a clock circuit 34 to count a present time is connected to the CPU 30, and the CPU 30 applies to the image compression/expansion circuit 24 the year-month-day information, that is, photographing date information obtained from the clock circuit 34. The photographing date information is written into the application marker segment of the image file by the image compression/expansion circuit 24.

If a stop key (not shown) constituting the operation key 32 is depressed, the CPU 30 stops the series of photographing/recording operations.

Incidentally, the image file recorded in the hard disk 28a is managed by the FAT system. An adoption of the FAT system makes it possible to gain access to the image file in the hard disk 28a from a personal computer (not shown) connected to the CPU 30 via an external interface circuit 36. Note that the personal computer has a similar key to the operation key 32, and the surveillance camera apparatus 10 is remotely controllable by the personal computer.

Figure 3:
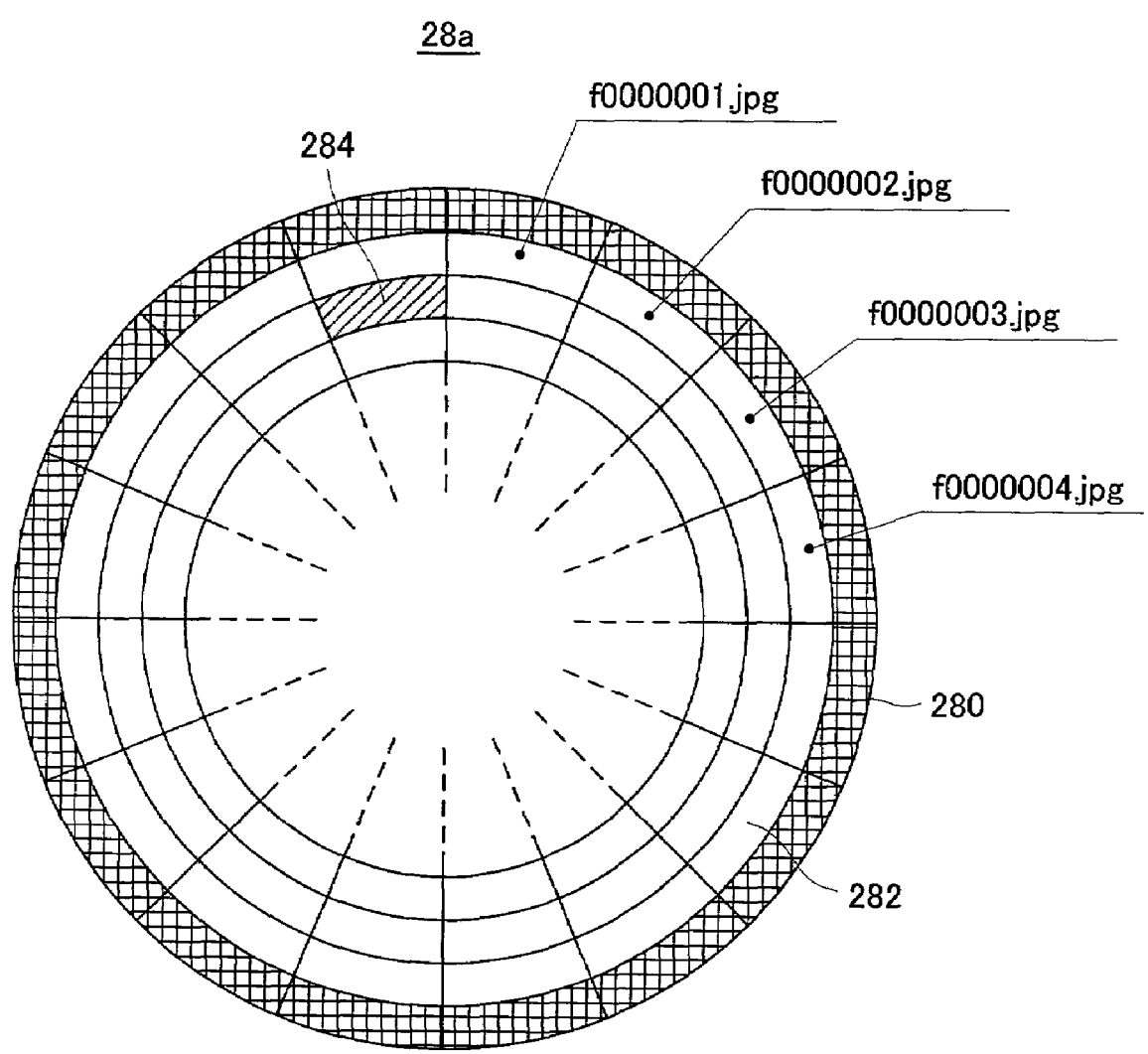
FIG. 3 is an illustrative view showing one example of structure of a hard disk.

Referring to FIG. 3, the hard disk 28a has a management area 280 formed at an outer periphery and a data area 282 formed inside the management area 280. The data area 282 is finely divided into a plurality of clusters 284.

In a conventional FAT system, a cluster size C is set to a relatively small value such as 2 kB to 4 kB in order to increase utility efficiency of the disk. In contrast, in this embodiment, the cluster size is set to a relatively large value such as several tens of kB to hundreds of kB (64 kB to 256 kB or so, for example). If a maximum size of the image file is defined as Fmax, the cluster size of this embodiment is N times (N=1, for example) of the maximum size Fmax. Referring to FIG. 4, the image file is recorded in the cluster 284 one by one in corresponding order to the photographing date. The link information indicating a using state or a link state of the cluster 284 is recorded in the management area 280 as shown in FIG. 5. Each of "f0000001.jpg", "f0000002.jpg" . . . represents a file name of each image file.

Figure 6:
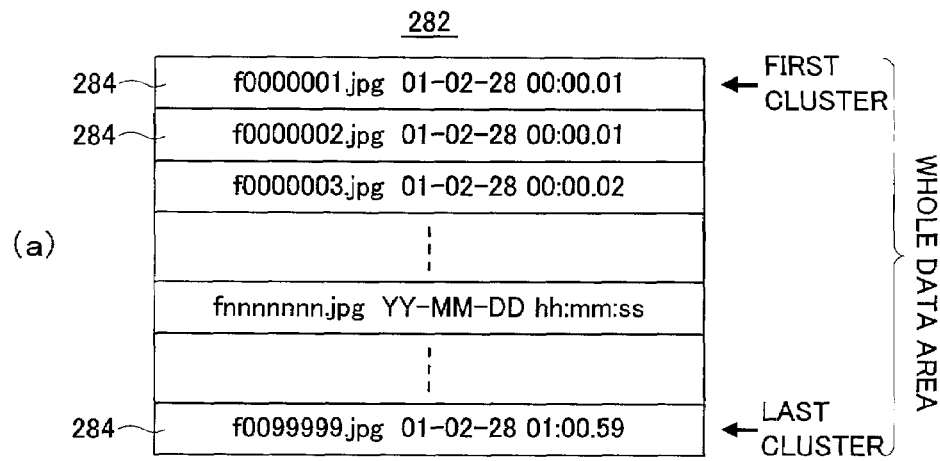
FIG. 6 (a) is an illustrative view showing one part of operation of FIG. 1 embodiment.
Figure 6:
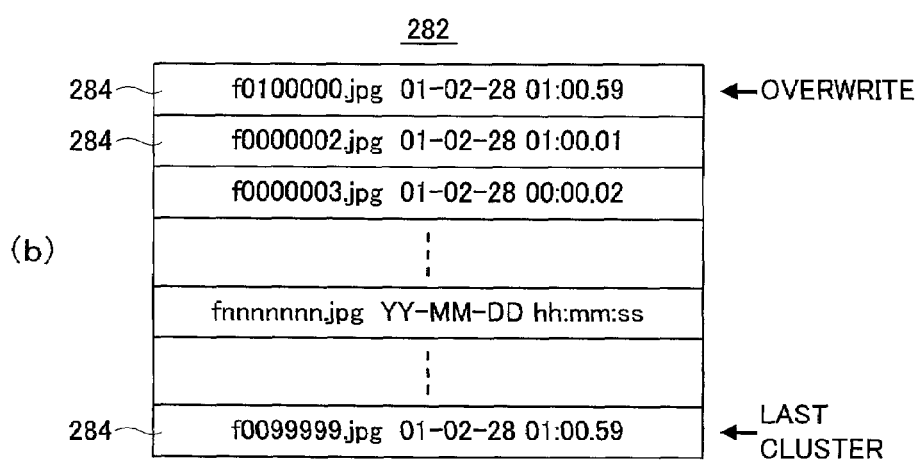
Figure 6:
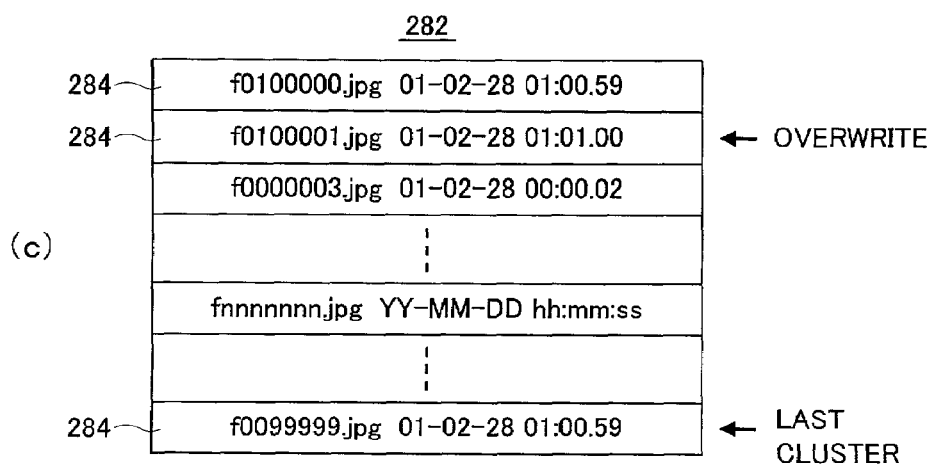

Note that in a case that an image file is recorded in all of the clusters 284 as shown in FIG. 6(a) (99999 units of clusters in the Figure), a cluster 284 having the oldest photographing date (a cluster in which the image file of "f0000001.jpg" is recorded) is treated as a vacant cluster. As shown in FIG. 6(b), a newly created image file, e.g. "f0100000.jpg" is overwritten into the vacant cluster 284. In addition, as shown in FIG. 6(c), an image file, e.g. "f01000001.jpg" created succeeding to the image file, e.g. "f0100000.jpg" is written into a cluster in which an image file "f0000002.jpg" is recorded.

Figure 7:
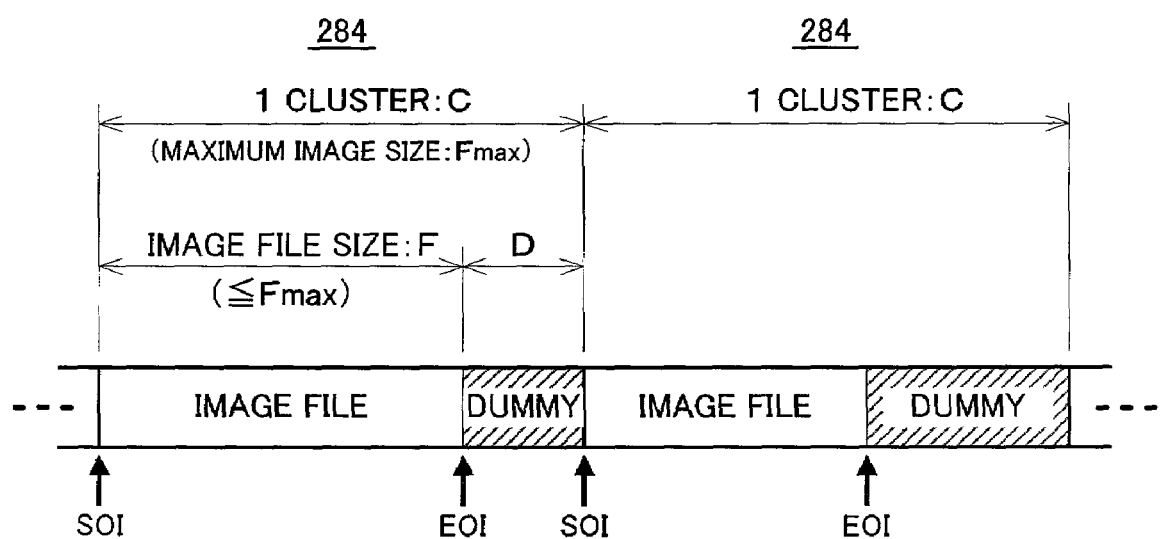
FIG. 7 is an illustrative view showing one example of a recording state of each cluster forming the data area.

Referring to FIG. 7, the image file is recorded in such a manner that "SOI" is present at a forefront portion of the cluster 284 (left side in FIG. 7). Since a size F of the image file is equal to or smaller than the cluster size C (=Fmax), if F<Fmax is true, a redundant portion D equal to a difference of the file size F and the cluster size C (=C−F) is formed following the marker "EOI" which is added to a rearmost end of the image file. Therefore, in this embodiment, arbitrary dummy data (uncertain data) is added to the redundant portion D so as to fill in one cluster 284 with the image file and the dummy data.

Figure 8:
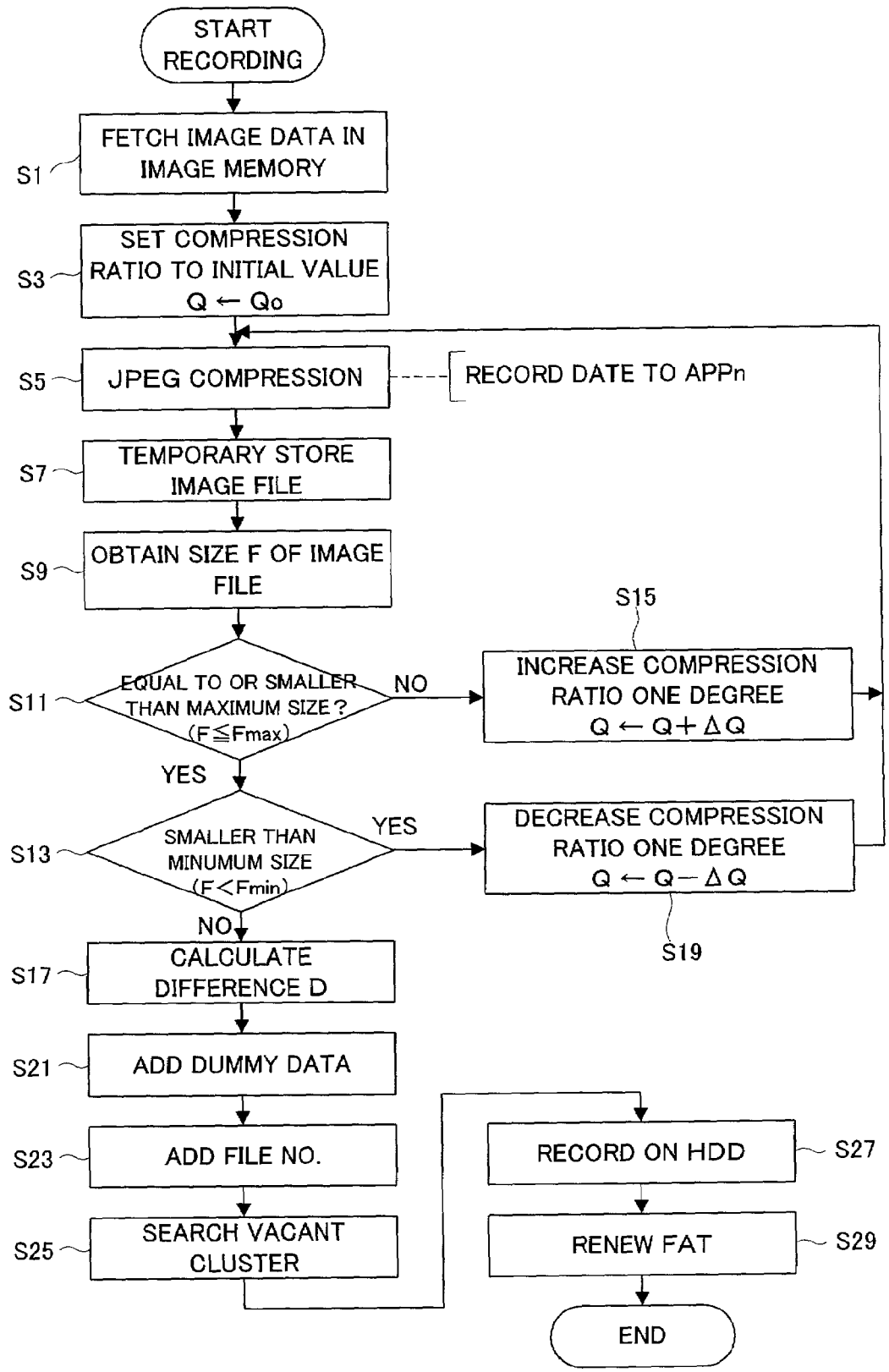
FIG. 8 is a flowchart showing one part of operation of FIG. 1 embodiment.

The CPU 30 executes a photographing/recording process shown in FIG. 8 on a predetermined time interval basis. Note that a control program corresponding to a flowchart shown in FIG. 8 is previously stored in a ROM 40.

Referring to FIG. 8, the CPU 30 fetches the image data generated in the signal processing circuit 16 onto the image memory 22 in a step S1, and a compression ratio Q (Q factor) of the image compression/expansion circuit 24 is set to an initial value $Q_o$ in a step S3. Furthermore, a compression process of the image data is instructed to the image compression/expansion circuit 24 in a step S5. At this time, the CPU 30 applies the year-month-day information obtained from the clock circuit 34 to the image compression/expansion circuit 24. The year-month-day information is written into the application marker segment by the image compression/expansion circuit 24.

The CPU 30 writes the image file generated by the image compression/expansion circuit 24 onto the temporary storing memory 26 in a step S7. The CPU 30 further obtains the size F of the image file from the image compression/expansion circuit 24 in a step S9, and compares the size F in question to a maximum size Fmax (=C) in a step S11. If the obtained size F is equal to or smaller than the maximum size Fmax, the CPU 30 proceeds to a step S13. On the other hand, if the size F is bigger than the maximum size Fmax, the CPU 30 increases the compression ratio Q by one degree (=ΔQ) in a step S15, and subsequently returns to the step S5. The image data is compressed once again in accordance with the renewed compression ratio Q.

Proceeding to the step S13, the CPU 30 compares the size F to a previously determined minimum size Fmin. If the size F is equal to or bigger than the minimum size Fmin, the CPU 30 determines that the size F is an appropriate size, and proceeds to a step S17. On the other hand, if the size F is smaller than the minimum size Fmin, the CPU 30 determines that the size F is excessively small, and returns to the step S5 after decreasing the compression ratio Q by one degree (=ΔQ) in a step S19. The image data is once again compressed in accordance with the renewed compression ratio Q.

The CPU 30 determines a difference D of the size F and the cluster size C in the step S17, and adds dummy data in a size equal to the difference D to an rear end of the image file in a step S21. Subsequently, the CPU 30 adds a file name (a file number) to the image file in a step S23, and searches a vacant cluster 284 from the hard disk 28a in a step S25. The CPU 30 further records the image file in the vacant cluster 284 in a step S27, and renews the link information (FAT) of the management area corresponding to the cluster 284 in which the image file is recorded in a step S29.

The image file thus recorded in the hard disk 28a is to be reproduced in an image reproducing mode. When a reproduction instruction of a desired image file is applied in the image reproduction mode, more specifically, when the desired image file is selected by an image designating key (not shown) constituting the operation key 32, and a reproduction start key (not shown) is operated, the CPU 30 instructs the hard disk drive 28 to reproduce the selected image file. The hard disk drive 28 reproduces the desired image file from the hard disk 28a, and stores the reproduced image file onto the temporary storing memory 26. Note that in the image reproduction mode, it may be possible to successively reproduce a plurality of image files in response to one reproducing instruction.

The image file stored on the temporary storing memory 26 is expanded in the JPEG format by the image compression/expansion circuit 24. The expanded image data is inputted into the signal processing circuit 16 via the image memory 22. The signal processing circuit 16 converts the inputted image data into an analog signal, that is, an image signal, and the converted image signal is applied to the display 18. Therefore, a reproduced image of an object is represented on the display 18. Note that if the stop key constituting the operation key 32 is depressed, the CPU 30 suspends the series of reproducing operations, and finishes the image reproduction mode.

Note that a timing to write the image file onto the temporary storing memory 26 from the hard disk 28a, a timing to expand the image file stored on the temporary storing memory 26 by the image compression/expansion circuit 24, a timing to store the expanded image data onto the image memory 22, and a timing to convert the image data into the image signal by the signal processing circuit 16 are controlled on the basis of the timing signal produced by the timing circuit 20. Furthermore, if the image file read from the hard disk 28a is transferred to the personal computer via the external interface circuit 36, it is also possible to reproduce the image file in question by the personal computer.

Figure 9:
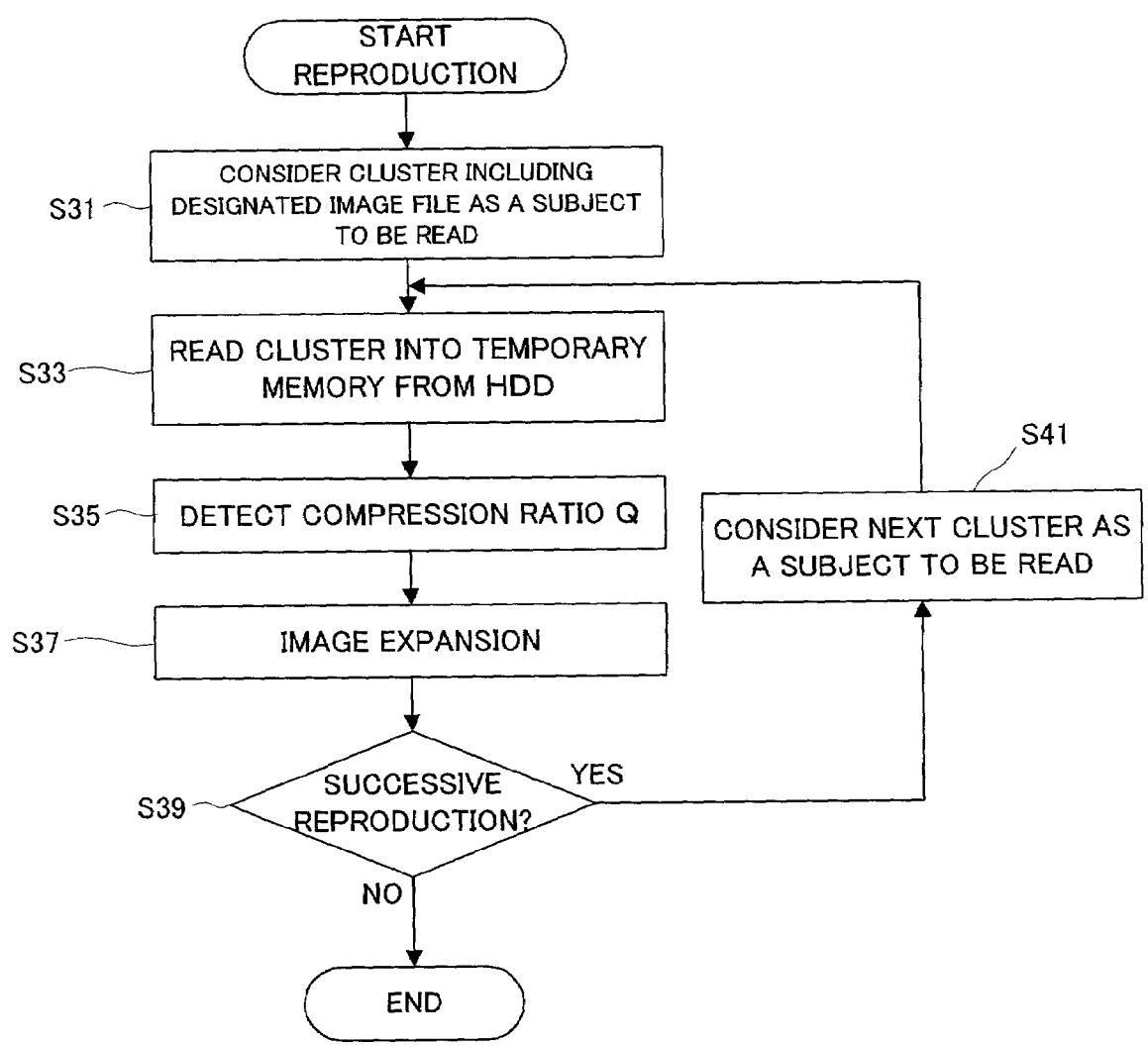
FIG. 9 is a flowchart showing another part of operation of FIG. 1 embodiment.

The CPU 30 executes an image reproduction process according to a flowchart shown in FIG. 9. Note that a controlling program corresponding to the flowchart is also previously stored in the ROM 40.

Referring to FIG. 9, the CPU 30 considers a cluster 284 including an image file designated by the operation key 32 as a subject to be read in a step S31, and instructs the hard disk drive 28 to read the image file from the cluster 284 in a step S33. The image file read by the hard disk drive 28 is stored on the temporary storing memory 26. The CPU 30 detects the compression ratio Q of the image file stored on the temporary storing memory 26 in a step S35, and instructs the image compression/expansion circuit 24 to carry out a expansion process according to the detected compression ratio Q in a step S37.

The CPU 30 determines whether or not the reproducing instruction from the operation key 32 is a successive reproduction in a step S39 after a completion of the expansion process by the image compression/expansion circuit 24. If the successive reproduction is herein determined, the CPU 30 considers a cluster in which an image file to be reproduced next is recorded as a subject to be read in a step S41, and subsequently returns to the step S33. On the other hand, if NO is determined in the step S39, the CPU 30 finishes a reproduction operation.

Incidentally, if the link information recorded in the management area 280 of the hard disk 28a is destructed, it is not possible to reproduce the image file in a reproducing process shown in FIG. 9. This is the reason why the surveillance camera apparatus 10 of this embodiment is also provided with a function to restore to a normal state capable of reproducing the image file by the reproducing process shown in FIG. 9. This restoring operation of the image file is done in a restoring mode.

Note that prior to the restoring mode, a recovery-use hard disk drive 38 is connected to the CPU 30 in addition to a defective hard drive 28 having the destructed link information. Similar to the above hard disk drive 28, the recovery-use hard disk drive 38 also contains a hard disk 38a and a spindle motor 38b for holding the hard disk 38a. Furthermore, the recovery-use hard disk drive 38a has a storing capacity at least bigger than that of the defective hard disk 28a, and is formed of a similar management area and a data area to the hard disk 28a.

When a restoring starting key (not shown) constituting the operation key 32 is depressed in order to restore the image file recorded on the hard disk 28a, the CPU 30 enters in the restoring mode. Firstly, the CPU 30 reads cluster data including the image file from each cluster 284 formed on the defective hard disk 28a, and records the read cluster data into the hard disk 38a in the recovery-use hard disk drive 38. At the same time, the link information for managing the cluster of the recovery-use hard disk drive 38a is written into the management area of the recovery-use hard disk drive 38a. Note that a photographing date of the restored image file is to remain as a previous date.

Figure 10:
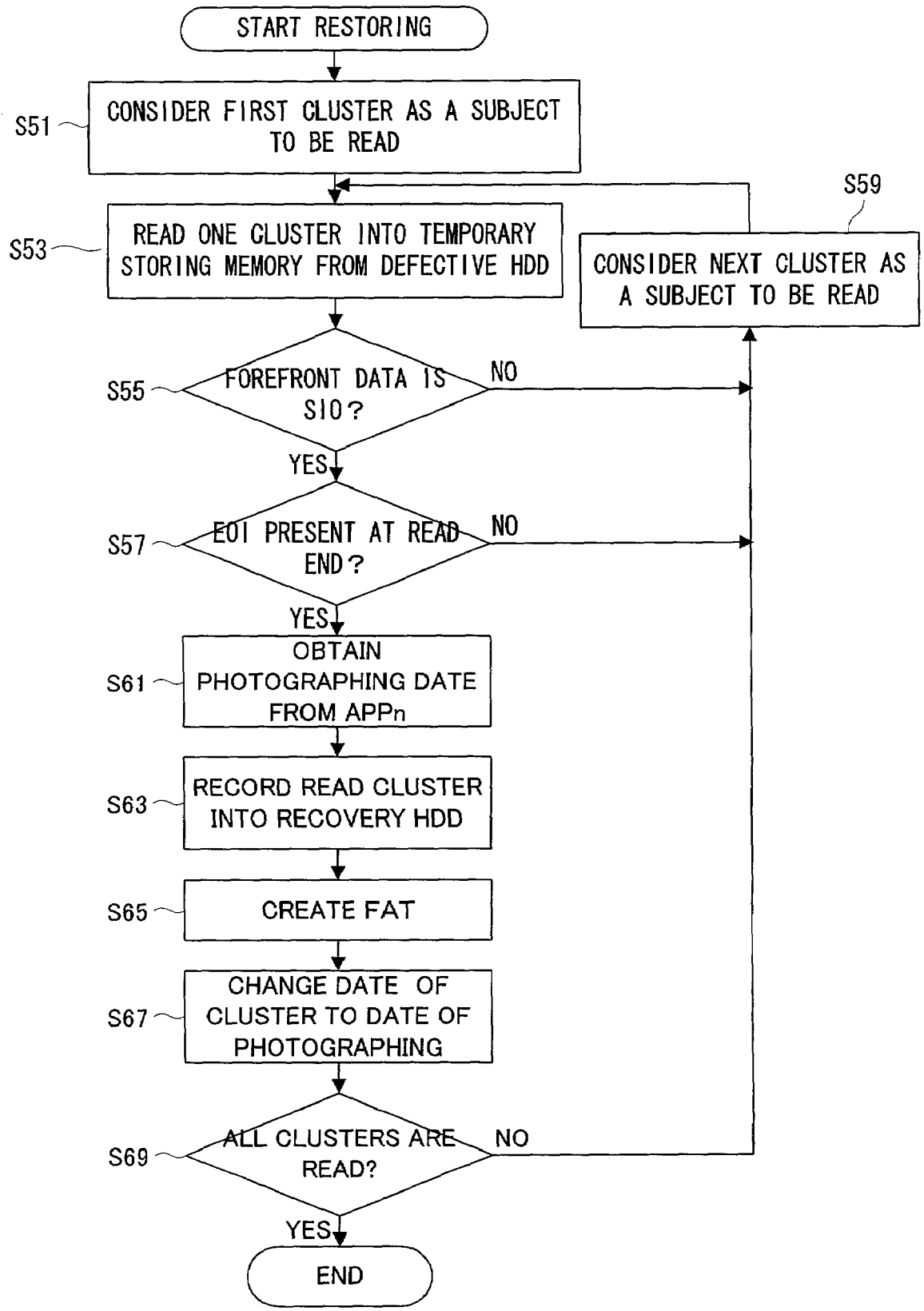
FIG. 10 is a flowchart showing another part of operation of FIG. 1 embodiment.

In the restoring mode, the CPU 30 carries out a flowchart shown in FIG. 10. Note that a program corresponding to the flowchart is also previously stored in the ROM 40.

Referring to FIG. 10, the CPU 30 considers a first cluster 284 (a cluster 284 including an image file to which the smallest number is assigned as a file name, for example) out of each cluster 284 in the defective hard disk 28a as a subject to be read in a step S51. Subsequently, in a step S53, the CPU 30 instructs the hard disk drive 28 to read cluster data recorded in the cluster 284 which is a subject to be read. The cluster data read by the hard disk drive 28 is written onto the temporary storing memory 26.

The CPU 30 determines whether or not forefront data of the cluster-data stored on the temporary storing memory 26 is "SOI" in a step S55. If YES is herein determined, the CPU 30 understands that at least a forefront portion of the read cluster data is not destroyed, and there is a possibility to appropriately restore the image file. Then, the process proceeds to a step S57.

On the other hand, if NO is determined in the step S55, the CPU 30 determines that it is not possible to appropriately restore the image file, and considers a next cluster 284 as a subject to be read in a step S59. More specifically, the CPU 30 considers a cluster 284 including an image file to which the second smallest number next to the cluster 284, e.g. a subject to be read at present is attached as a subject to be read. Upon completion of the step S59, the CPU 30 returns to the step S53.

Upon proceeding to the step S57, the CPU 30 determines whether or not "EOI" is present in the cluster data stored on the temporary storing memory 26. If YES is herein determined, the CPU 30 considers that it is possible to appropriately restore the image file included in the cluster data in question, and then proceeds to a step S61. On the other hand, if NO is determined in the step S57, the CPU 30 considers that it is not possible to appropriately restore the image file, and then returns to the step S53 via the step S59.

The CPU 30 obtains the photographing date information from the application marker segment of the image file included in the cluster data stored on the temporary storing memory 26 in the step S61, and directly records the cluster data into the data area of the recovery-use hard disk 38a in a step S63. Subsequently, the CPU 30 creates link information of the cluster in which the cluster data is recorded in a step S65, and records the created link information in the management area of the recovery-use hard disk 38. Furthermore, the CPU 30 writes the photographing date obtained in the above step S61 toward the application marker segment of the image file recorded in the recovery-use hard disk 38a in a step S67.

Subsequently, the CPU 30 determines whether or not the cluster data is read from all of the clusters 284 in the defective hard disk 28a in a step S69. If NO is determined, the process returns to the step S53 via the step S59. On the other hand, if YES is determined in the step S69, the CPU 30 finishes the restoring process.

In another embodiment of the present invention, it is possible to record ($N \geq 2$) of image files into one cluster 284.

Figure 11:
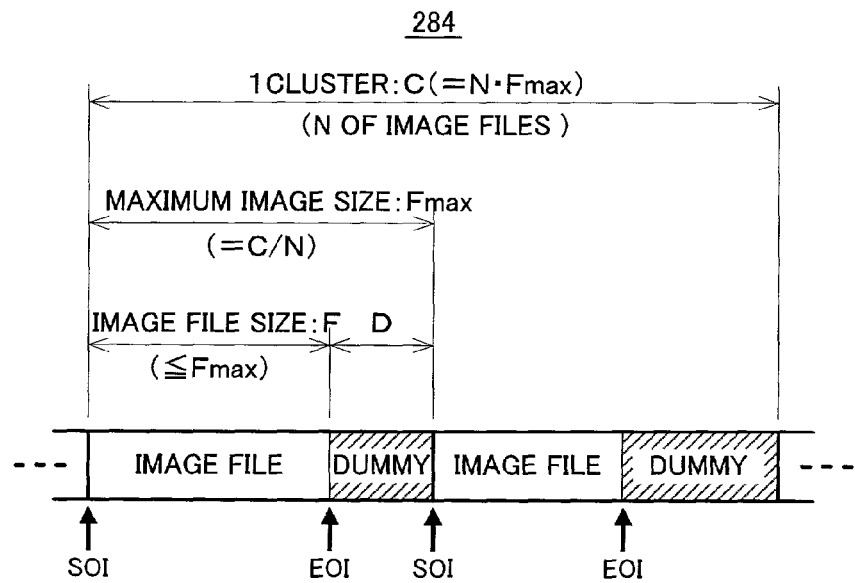
FIG. 11 is an illustrative view showing one part of operation of another embodiment of the present invention.

In this case, each cluster size C is N times of the maximum size Fmax of the image file as shown in FIG. 11 (N=2 in FIG. 11). Each cluster 284 is divided into N of portion areas, and one image file is recorded in one portion area. At this time, the image file is recorded in such a manner that "SOI" is present at a forefront of the portion area. Furthermore, a redundant portion D is formed between "EOI" of the image file and "SOI" of a next image file. Similar to the above embodiment, dummy data is recorded in the redundant portion D.

Figure 12:
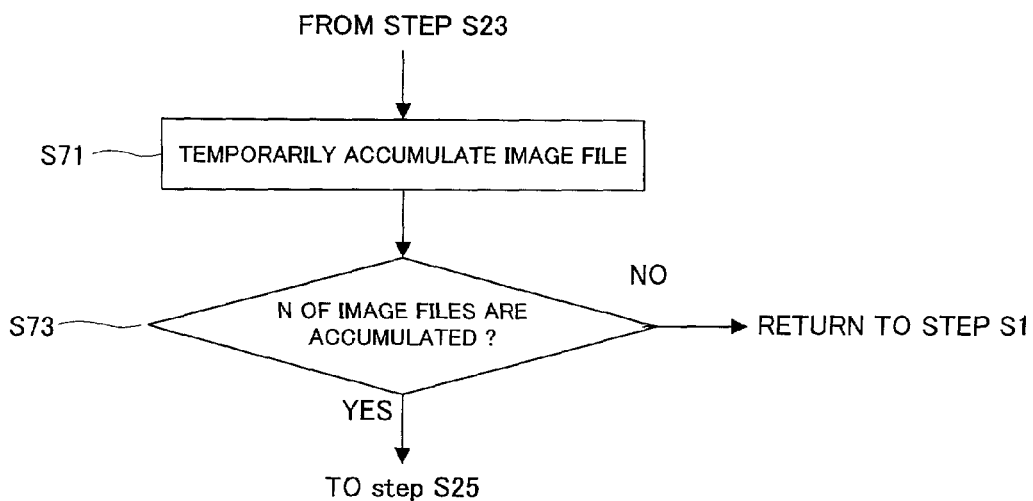
FIG. 12 is a flowchart showing one part of operation of FIG. 11 embodiment.

When the N of image files are thus recorded in one cluster 284, the CPU 30 carries out a flowchart shown in FIG. 12 between the step S23 and the step S25 shown in FIG. 8.

In other words, after adding a file number to the image file in the step S23 in FIG. 8, the CPU 30 accumulates the image file to which the file number is added in the temporary storing memory 26 in a step S71 shown in FIG. 12. Subsequently, the CPU 30 determines whether or not the number of image files accumulated in the temporary storing memory 26 reaches to N in a step S73, and the process returns to the step S1 if the number is less than N. On the other hand, if the N of image files are accumulated in the temporary storing memory 26, the CPU 30 proceeds from the step S73 to the step S25 shown in FIG. 8.

Figure 13:
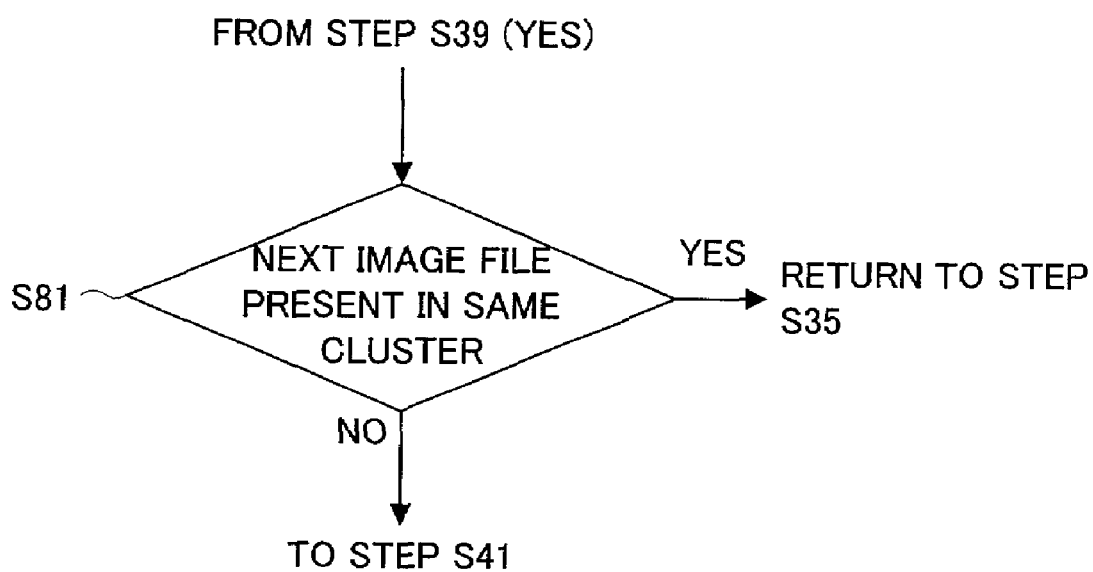
FIG. 13 is a flowchart showing another part of operation of FIG. 11 embodiment.

In addition, when an arbitrary image file is reproduced from the hard disk 28a on which N of image files ($N \geq 2$) are recorded in one cluster, the CPU 30 carries out a flowchart shown in FIG. 13 between the step S39 and the step S41 shown in FIG. 9.

That is, when the successive reproduction is determined in the step S39 in FIG. 9, the CPU 30 determines whether or not an image file following the image file to be reproduced at present is present in the identical cluster 284 in a step S81 shown in FIG. 13. If YES is herein determined, the CPU 30 returns to the step S35 in FIG. 9 in order to reproduce the image file. On the other hand, if NO is determined in the step S81, the CPU 30 proceeds to the step S41 in FIG. 9 in order to consider a next cluster 284 as a subject to be read.

As understood from the above descriptions, the cluster size C is set as being equal to or bigger than the file size F of the image file, and the image file is recorded in such a manner that "SOI" is present at a forefront of the cluster 284. This is the reason why it does not occur that one image file is recorded in a plurality of clusters 284. Therefore, even if the link information in the management area 280 is destructed, it is possible to easily restore the image file. Furthermore, the FAT system is adopted in managing the image file so that it is possible to maintain a versatility of the system.

Note that descriptions in regard to the surveillance camera apparatus 10 were made in this embodiment. However, the present invention can be applied to another image recording apparatus.

Furthermore, in this embodiment, an internal hard disk is used as a recording medium. However, a detachable recording medium such as a flexible disk, a CD-R (Compact Disk Recordable ), a CD-RW (Compact Disk ReWritable), a rewritable DVD (Digital Versatile Disc), etc. may be used in place thereof.

Furthermore, in this embodiment, the restored image file is recorded in another recovery-use hard disk drive 38 other than the hard disk drive 28. However, unless there is any problem in regard to access to the hard disk 28a in the defective hard disk drive 28, it may be possible to renew the link information in the hard disk 28a.

Also, in this embodiment, the JPEG format is adopted as an image data compression system. However, it is also possible to adopt other systems such as GIF (Graphic Interchange Format), a PNG (Portable Network Graphics), no to mention an MPEG (Motion Picture Expert Group), etc. Note that in adopting the MPEG system, it is necessary to record N of GOPs (Group of Pictures) into one cluster.

Furthermore, it is possible to use other light-receiving elements such as a CMOS type, etc. instead of a CCD light-receiving element. In addition, it is possible to adopt a UDF (universal disk format) system instead of the FAT system as a system for managing an image file recorded in a hard disk. Still furthermore, in this embodiment, dummy data is added to a rear end of the image file recorded in the cluster. However, an adding process of the dummy data may be omitted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording apparatus which records image signals in a compressed state into a recording medium on which a plurality of unit recording zones each of which has a first size are formed, comprising:

an inputter for inputting the image signals;

a compressor for compressing each of the image signals inputted by said inputter into a second size which is equal to or smaller than 1/N(N:integer) of the first size;

a recorder for respectively recording compressed image signals generated by the compressor into the unit recording zones, wherein said recorder includes a searcher for searching unit recording zones each of which is in a vacant state, a writer for writing the compressed image signals into the unit recording zones discovered by said searcher, and a creator for creating link information indicating a link state of the unit recording zones in which the compressed image signals are written;

an assigner for assigning a successive identifying number to each of the compressed image signals;

an acceptor for accepting a restoring instruction of said link information; and a restorer for restoring said link information on the basis of said identifying number in accepting said restoring instruction.

2. An image recording apparatus, further comprising:

a holder for holding a recording medium on which a plurality of unit recording zones each of which has a first size are formed;

a compressor for compressing each of a plurality of still images up to a second size which is equal to or smaller than 1/N(N:positive integer) of the first size;

a recorder for recording compressed still images created by said compressor into the plurality of unit recording zones at a rate of N images per zone; and a link former for forming a link between recorded unit recording zones out of the plurality of unit recording zones, further comprising:

an assigner for assigning a successive identifying number to each of the compressed still images created by said compressor; and a restorer for restoring the link based on the identifying numbers assigned by said assigner at a time of accepting a restoring instruction in a state of the link destroyed.

* * * * *